United States Patent Office 2,718,525
Patented Sept. 20, 1955

2,718,525
PREPARATION OF PHTHALONITRILES

David W. McDonald, Texas City, Tex., assignor to Monsanto Chemical Company, St. Louis, Mo., a corporation of Delaware No Drawing. Application January 4, 1954,
Serial No. 402,133

5 Claims. (Cl. 260—465)

This invention is directed to a process for the production of phthalonitriles by the reaction of benzonitrile and hydrocyanic acid.

Several methods, both catalytic and non-catalytic, have been proposed and developed for the production of aromatic dinitriles. The one in more general use is the catalytic vapor-phase reaction of the dicarboxylic acids or their corresponding anhydrides or imides with ammonia. While it is an effective process on a commercial scale, it requires very careful control during operation as well as elaborate and expensive equipment. Another method in current use involves the dehydration of carboxylic acid amides, imides, or ammonium salts in solution in a tertiary base by means of phosgene or halogen compounds of phosphorus and sulfur. The cost of the starting materials and the number of steps involved in such a process, however, make this method somewhat impractical in large-scale operations. In another method where aromatic halogen-containing compounds are reacted with hydrogen cyanide in the presence of a metallic catalyst, significant amounts of hydrogen halide by-products are produced along with the desired product and the process is economically feasible only where there is an established outlet or market for such by-products.

A simple, relatively inexpensive, and efficient process which overcomes many of the disadvantages of the prior art processes is that in which phthalonitriles are prepared by the reaction of benzonitrile and hydrocyanic acid. In this process, however, the isomer distribution leaves something to be desired in that the ratio of the para-isomer, the most valuable commercially of the three isomers, to the other isomers is somewhat low.

It is an object of the present invention, therefore, to provide an improved process for the production of aromatic dinitriles from benzonitrile and hydrocyanic acid.

It is a further object of the invention to provide an improved process for the production of aromatic dinitriles from benzonitrile and hydrocyanic acid whereby the isomer distribution of the product nitriles may be controlled to produce greater yields of the para-isomer.

Other objects and advantages of the invention will become apparent from the following description and the appended claims.

According to the invention, a mixture of phthalonitriles is prepared by passing a mixture of the vapors of hydrocyanic acid and benzonitrile over a tungsten catalyst at elevated temperatures in the range from 400–1000° C. The reaction is carried out at an average reaction temperature of at least 400° C., and preferably at an average temperature within the range from 700–750° C. Temperatures as high as 900–1000° C. may be used, but the yields are reduced somewhat at these higher temperatures.

In the preferred mode of operation the reactants are maintained at substantially atmospheric pressures. If desired, however, pressures may be materially reduced below atmospheric, or raised to superatmospheric levels without affecting the desired reaction.

In carrying out the reaction, contact time between reactants and catalyst at reaction temperature may vary widely. Preferred contact times will vary with the temperatures to which the reaction mixture is heated. Generally, a contact time of from about 2 to about 10 seconds is satisfactory. For maximum yields and efficiency, a contact time in the range from about 5 to about 8 seconds appears to be optimum.

Although the ratio of reactants is not critical, an excess of hydrocyanic acid over that required for reaction with benzonitrile is preferred. Ratios ranging from 1–10 moles of hydrocyanic acid for every mole of benzonitrile are suitable, with a ratio of 4 moles of hydrocyanic acid to every mole of benzonitrile being preferred. Carbonization of the hydrocyanic acid occurs if too high ratios are employed, while excessively low ratios tend to give low yields of the dinitriles. Any excess hydrocyanic acid employed may be recovered for re-use.

The following examples are presented to illustrate the invention and are not to be construed as limiting it in any manner except as it is limited in the appended claims.

Example I

A 1-in. quartz tube, 2 ft. long, externally heated by means of two electric furnaces was employed as a combination preheater-reactor. Benzonitrile and hydrocyanic acid, in the ratio of 4 moles of hydrocyanic acid to every mole of benzonitrile, were introduced into the preheater section where they were vaporized and preheated to a temperature of 400–500° C. This preheated reaction mixture was then passed through the second or reactor portion of the 1-in. quartz tube heated to a temperature of approximately 750° C., at a rate of approximately 30 cc. per second so that residence time in the reactor tube was approximately 10 seconds.

The reaction products leaving the reactor were condensed in an ice-water condenser and two Dry-Ice traps. The condensate was subjected to distillation at atmospheric pressure to remove unreacted benzonitrile and the dinitrile fraction was then recovered by distillation at reduced pressure (150 mm. of Hg absolute). A yield of terephthalonitriles of approximately 60% was obtained.

A sample of this product was analyzed by infrared techniques and found to have the following isomer distribution:

| | Percent |
|---|---|
| Ortho-dicyanobenzene (phthalonitrile) | 10 |
| Meta-dicyanobenzene (isophthalonitrile) | 55 |
| Para-dicyanobenzene (terephthalonitrile) | 35 |

Example II

The procedure of Example I was repeated except that a 3-in. section of the quartz tube in this case was packed with wadded tungsten wire. About 53 g. of crude product was collected which upon fractionation yielded 5 g. (0.039 mole) of dinitrile fraction. This represented a yield of phthalonitriles of 78% based on unrecovered benzonitrile. Infrared analysis of a sample of this product for isomer distribution gave the following results:

| | Percent |
|---|---|
| Ortho-dicyanobenzene (phthalonitrile) | 1 |
| Meta-dicyanobenzene (isophthalonitrile) | 56 |
| Para-dicyanobenzene (terephthalonitrile) | 43 |

The results of these experiments demonstrate positively that the use of tungsten catalyst in the reaction of benzonitrile and hydrocyanic acid results not only in a significant increase in the para-isomer content of the product, but in increased yields as well.

It will be obvious to one skilled in the art that it is not necessary to use a quartz tube but any reaction tube resistant to the relatively high temperatures of the reaction such as nickel, stainless steel, or metal alloys, such as that known to the trade as Inconel, and the like will be suitable for the reaction.

What is claimed is:

1. A process for the production of phthalonitriles which comprises reacting benzonitrile and hydrocyanic acid in the vapor phase in the presence of a tungsten catalyst at a temperature from about 400 to about 1000° C.

2. A process for the production of phthalonitriles which comprises reacting benzonitrile and hydrocyanic acid in the vapor phase in the presence of a tungsten catalyst at a temperature from about 700 to about 750° C.

3. A process for the production of phthalonitriles which comprises reacting benzonitrile and hydrocyanic acid in the proportions of 1 to 10 moles of hydrocyanic acid for every mole of benzonitrile in the vapor phase in the presence of a tungsten catalyst at a temperature from about 400 to about 1000° C.

4. A process for the production of phthalonitriles which comprises reacting benzonitrile and hydrocyanic acid in the proportions of 4 moles of hydrocyanic acid for every mole of benzonitrile in the vapor phase in the presence of a tungsten catalyst at a temperature from about 700 to about 750° C.

5. A process for the production of phthalonitriles which comprises passing a reaction mixture of vaporized benzonitrile and hydrocyanic acid gas containing 4 moles of hydrocyanic acid gas to every mole of vaporized benzonitrile through a bed of tungsten catalyst at a temperature of about 750° C. at such a rate that the contact time is from about 2 to about 10 seconds.

References Cited in the file of this patent

UNITED STATES PATENTS

| | | |
|---|---|---|
| 2,449,643 | Cosby | Sept. 21, 1948 |
| 2,591,415 | Engelhardt et al. | Apr. 1, 1952 |